United States Patent [19]

McClure

[11] 4,069,738

[45] Jan. 24, 1978

[54] INSULATION RETAINER AND ATTACHMENT METHOD THEREFOR

[75] Inventor: Randall D. McClure, Decatur, Ill.

[73] Assignee: Caterpillar Tractor Co., Peoria, Ill.

[21] Appl. No.: 656,761

[22] Filed: Feb. 9, 1976

[51] Int. Cl.² .............................................. F16B 13/06
[52] U.S. Cl. .......................................... 85/70; 52/512;
85/36; 85/72; 29/432; 29/422
[58] Field of Search ................. 85/70, 71, 53, 55, 36,
85/72, 77, 78; 29/432, 522, 512, 509; 52/758 F,
758 D, 512, 364, 376, 700

[56] References Cited

U.S. PATENT DOCUMENTS

| 2,144,926 | 1/1939 | Lawton | 85/53 X |
|---|---|---|---|
| 2,365,629 | 12/1944 | Eckel | 85/55 X |
| 2,562,336 | 7/1951 | Selden | 85/70 |
| 3,267,205 | 8/1966 | Dozier | 85/72 X |
| 3,300,798 | 1/1967 | York | 85/77 X |
| 3,534,419 | 10/1970 | Deans et al. | 85/70 X |

FOREIGN PATENT DOCUMENTS

| 245,283 | 6/1963 | Australia | 85/70 |
|---|---|---|---|
| 1,307,435 | 9/1962 | France | 85/72 |

*Primary Examiner*—Ramon S. Britts

*Attorney, Agent, or Firm*—Phillips, Moore, Weissenberger, Lempio & Majestic

[57] ABSTRACT

The invention is concerned with a retainer for holding a sheet of insulation against a metal plate and with the method of seating a sheet of insulation against a metallic plate. The retainer comprises a linearly extending member made of a hard but deformable material and having a flange extending outwardly adjacent a first end thereof to sit against a first side of a metal plate with the remainder of the member extending through a hole in the plate and a bore extending longitudinally in the member from the first end thereof towards a second end thereof, the bore terminating at a chamber of larger orthogonal dimension than the bore itself, the chamber terminating short of the second end of the member. Also part of the retainer is a rod fitting within and extending outwardly from the bore and having at a first end thereof a head of larger orthogonal dimension than the bore, the head fitting within the chamber. Generally the rod includes a weak portion which is easily breakable. Also a part of the retainer is a stud projecting longitudinally from the member. A cap also generally forms a part of the retainer, the cap binding to the stud after the insulation is pushed over the stud to hold the insulation in place.

10 Claims, 4 Drawing Figures

INSULATION RETAINER AND ATTACHMENT METHOD THEREFOR

BACKGROUND OF THE INVENTION

1. Field of the Invention

The invention is concerned with holding sheets or batts of relatively soft material such as insulation against a plate of a relatively rigid material such as metal. More particularly the invention is concerned with a retainer for accomplishing such a holding operation and with a method of attaching insulation to a plate. Still more particularly, the invention is concerned with such a retainer and method as applied to a vehicle firewall plate or a cab wall plate.

2. Prior Art

Current practice in installing batts of insulation against firewalls and the like involves welding the head end of a multiple number of pins or nails at a predetermined location on the plate with the sharp end of the pins extending from one side of the plate. A batt of acoustic sound and heat absorbent insulation is then pushed over the points of the pins and thus held in place against the plate. Push on caps are generally forced over the sharp pins ends with the caps being of the self-locking variety. The push-on caps hold the insulation in place as well as to protect persons from injury by the sharp pin ends. Generally, the pins are prewelded to the plates and the plates are stored until needed for final assembly on to a vehicle or the like. Damage to the pins has sometimes been encountered when the plates are stacked or handled. Also, those people handling the plates must be very careful to avoid injury to themselves when handling them. Further, since the pins are generally prewelded to the plates, the plates have required extra room for storage and the like. Further yet, the welding operation takes a good deal of time and requires the talents of a trained welder. Another disadvantage of the current practice is that the configuration of the pins becomes an assembly (is fixed with respect to any particular plate) once the welding has been completed. Thus, separate plate assemblies must be prepared to accept insulation on different parts thereof.

The present invention eliminates completely the welding operation and allows stacking the plates in a very compact manner without any pin ends extending therefrom. Thus damage to the pin ends is eliminated. Further, the plates can if desired, have holes predrilled into them over substantially their entire area thus allowing their use for a number of applications or only specific preselected locations thus allowing easy and safe stacking and storing along with quick conversion to usable form by insertion of the insulation retainers of the invention in the holes. That is, in some applications one may make use of some of the holes in the plates to position studs therethrough while in other applications other of the holes in the plates will be utilized by positioning of studs therethrough. When final assembly of the plates is desired to provide studs with generally sharp ends thereon extending therethrough a unique blind-assembled rivet is used as the retainer for the insulation and a plurality of these rivets are assembled through any selected plurality of the holes in the plate dependent upon the size and shape of the insulation batt to be used on the particular plate. The insulation batt which is assembled to the plate may be relatively easily changed in thickness as by removing it and removing the blind-assembled rivets which were holding it in place without the necessity for breaking any welds and then new rivets can be inserted in some of the holes in the plate, which rivets have studs of a longer or shorter length than the original studs, and then insulation material which is either thicker or thinner than the original insulation material can be inserted over the new and different length studs. It is clear that any holes which are not utilized to attach the selected insulation will generally be closed off or covered by the remainder of the insulation blanket or batt.

SUMMARY OF THE INVENTION

In one sense the invention comprises a retainer for holding a sheet of a relatively softer material such as an insulation against a plate of a relatively rigid material such as metal. The retainer comprises a linearly extending member of a hard but deformable material having flange means extending outwardly adjacent a first end thereof to sit against a first side of a relatively rigid plate with the remainder of the member extending through a hole in the plate and a bore extending longitudinally in the member from the first end thereof towards a second end thereof, the bore terminating at a chamber of larger orthogonal dimension than the bore, the chamber terminating short of the second end of the member. Also a part of the retainer is a rod fitting within and extending outwardly from the bore and having at a first end thereof a head of larger orthogonal dimension than the bore, the head fitting within the chamber. The rod will generally include a weak portion which is easily breakable. Also, the retainer includes a stud projecting longitudinally from the member. The retainer will generally further include a protective holding cap fitting over the projecting stud.

In another sense, the invention comprises a method of securing a sheet of a relatively soft material such as insulation against a plate of a relatively rigid material such as metal. The method comprises inserting in a plurality of holes in a relatively rigid material a plurality of linearly extending members which fit snugly within the holes and have flange means adjacent a first end extending outwardly therefrom sufficiently to prevent passage of the members through the holes, the flange means fitting against a first side of the plate, the members including a bore extending longitudinally therein from the first end thereof towards a second end thereof, the bore terminating at a chamber of larger orthogonal dimension than the bore, the the chamber terminating short of the second end of the member, each of the members having a rod fitting within and extending outwardly from the bore and having at a first end thereof a head of larger orthogonal dimension than the bore, the head fitting within the chamber. The flange means is held against the first side of the plate and the head is pulled against the bore adjacent the second end of each of the members via a generally longitudinal force exerted on the rod to spread the member against a second side of the plate. The rod, if it has a weak portion as in two of the embodiments of the invention discussed below, is broken at the weak portion and a sheet of relatively soft material is pushed over a plurality of studs which pierce it, one stud projecting longitudinally from each of the members generally away from the plate. Then it is secured in place by caps.

BRIEF DESCRIPTION OF THE DRAWING

The invention will be better understood by reference to the figures of the drawing wherein like numbers denote like parts throughout and wherein.

DETAILED DESCRIPTION OF THE PREFERRED EMBODIMENTS

Figure 1:
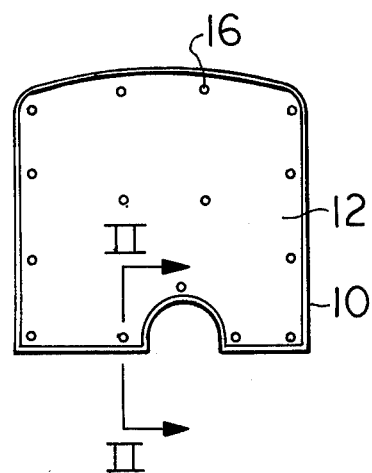
FIG. 1 illustrates a face view of the rearside of a vehicle firewall having insulation thereon and retainer push-on caps.
Figure 2:
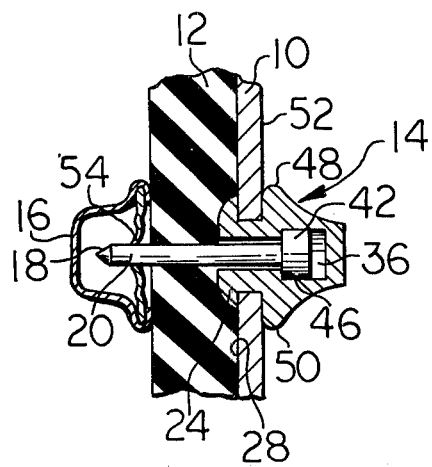
FIG. 2 illustrates an enlarged sectional view of the vehicle firewall taken along the line II—II of FIG. 1.
Figure 3:
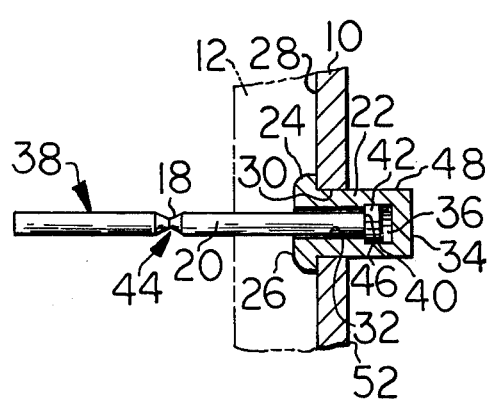
FIG. 3 illustrates in a view similar to FIG. 2 the firewall of a vehicle with a blind-assembled rivet therein prior to formation of the rivet head.
Figure 4:
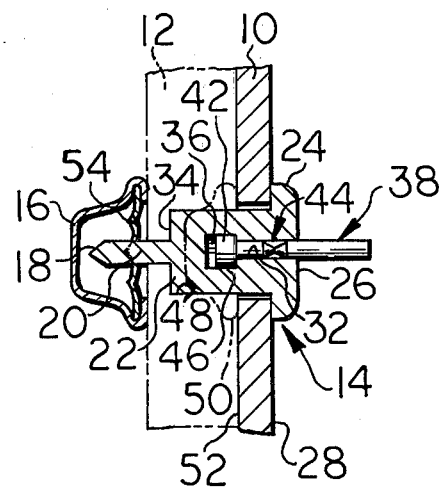
FIG. 4 is a similar view to FIG. 2 but illustrates an alternate embodiment of the blind-assembled rivet wherein said rivet is inserted from the outside of the firewall of the vehicle.

Turning now to the figures of the drawing and most specifically to the individual parts thereof it will be noted that FIG. 1 illustrates a vehicle firewall or cab wall plate 10 having attached thereto an insulating sheet 12 via a plurality of retainers 14 which are shown most clearly in FIGS. 2-4 with FIG. 2 representative of either the preferred embodiment or a first alternate embodiment of the invention and FIG. 4 showing a second alternate embodiment thereof. A series of protective push-on caps 16 serve to hold the insulating sheet 12 in place and further to protect people handling or otherwise adjacent the plates 10 from injuring themselves by contacting the sharp pointed tips 18 of the studs 20 which extend from the retainers 14 a distance at least twice the thickness of the plate 10. It is of course to be noted that the plate 10 is generally made of a relatively rigid material, for example a metal such as steel. It is further apparent that the insulating sheet 12 is generally made of a relatively soft material compared to the plate 10 such as for example polyethylene foam, fiberglass or the like.

Turning now most particularly to FIGS. 2 and 3, the structure of the retainer 14 will be discussed in detail. It will be noted that the retainer 14 comprises a linearly extending member 22 made of a hard but deformable material, generally a metal material, which has flange means, or more particularly a first flange 24 extending outwardly adjacent a first end 26 thereof. The first flange 24 sits against a first side 28 of the plate 10 with the remainder of the linearly extending member 22 extending through a hole 30 in the plate 10. A bore 32 extends longitudinally within the member 22 from the first end 26 thereof towards a second end 34 thereof. The bore 32 terminates at a chamber 36 of larger orthogonal dimension (diameter) than the orthogonal dimension of the bore 32. The chamber 36 terminates short of the second end 34 of the member 22. A rod 38 from which the stud 20 is eventually formed fits within and extends outwardly from the bore 32 and has at a first end 40 thereof a head 42 of larger orthogonal dimension (diameter) than the diameter of the bore 32. The head 42 fits within the chamber 36. The rod 38 may include a weak portion 44 as shown in FIG. 3, the weak portion 44 being external of the bore 32 and also external of the chamber 36 at a spaced distance away from the first flange 24. The weak portion 44 is easily breakable to leave behind the projecting stud 20 projecting from the first side 28 of the plate 10. Alternately, the rod 38 may be relatively short and end at the pointed tip 18 without including the weak portion 44. As will be noted, the tips 18 will be generally tapered and generally sharp enough to easily pierce an insulating sheet 12 which is pushed against it. To fix the linearly extending member 22 in place within the hole 30, it is generally placed with the first flange 24 against the first side 28 of the plate 10 and a longitudinal pulling force is exerted upon the rod 38 while the first flange 24 is held against the plate 10. This results in the head 42 of the rod 38 bearing against a shoulder 46 formed where the bore 32 joins the chamber 36. Since the member 22 is made of a deformable material what results is an outward flow of a cylindrical wall 48 to form a second flange 50 which bears against a second side 52 of the plate 10. In this manner the studs 20 can be made to extend generally perpendicularly and rigidly from the plate 10 and more particularly from the first side 28 thereof without the necessity for any welding. Also, it is clear that the plates 10 can be stored and shipped without the retainers 14 attached thereto and said retainers can then be easily attached in the field. It is clear that the insulating sheet 12 can then be pushed over the studs 20 and that finally the caps 16 can be fitted over the tips 18 thereof to hold the insulating sheet 12 in place and to protect persons in the vicinity from harm by the tips 18. The caps 16 as previously stated are generally of the snap-fit type and would normally include a resilient member 54 therein which grips the stud 20 and resists pulling off therefrom.

Turning now to the alternate embodiment illustrated in FIG. 4 it will be seen that the linearly extending member 22 is generally identical to the linearly extending member 22 of the embodiments illustrated in FIGS. 2 and 3 with the exception that the stud 20 in the case of the embodiment shown in FIG. 4 extends longitudinally from and is generally integral with the second end 34 of the member 22. Further, in the embodiment illustrated in FIG. 4 it is clear that the flange 24 again sits against the first side 28 of the plate 10 as in FIGS. 2 and 3. It should be pointed out, however, as discussed below that either the first side 28 or the second side 52 of the plate 10 can be the interior (or exterior) side thereof. Thus, it is seen that in the embodiment illustrated in FIG. 4 one pulls upon the rod 38 from an opposite side of the plate 10 than in the embodiments shown in FIGS. 2 and 3 in order to have the stud 20 extend in the same direction. For example, if the first side 28 of the plate 10 is interior of the vehicle and one utilizes the embodiment shown in FIGS. 2 and 3, one must pull upon the rod 38 from within the vehicle in order to form the second flange 50 exterior of the vehicle with the stud 20 pointing interior of the vehicle from the retainer 14. On the other hand, working with the embodiment shown in FIG. 4 one can form the second flange 50 with the stud 20 pointing interior of the vehicle from the retainer 14 by forming the second flange 50 from the exterior of the vehicle, which in the embodiment of FIG. 4 is the first side 28 of the plate 10. In both cases, the stud 20 will end up projecting generally perpendicularly inwardly from the plate 10. Another difference between the embodiment illustrate in FIG. 4 and the embodiment of FIGS. 2 and 3 wherein the rod 38 includes the weak portion 44, is that the weak portion 44 in the embodiment of FIG. 4 is within the bore 32 in the member 22. Thus, after the rod 38 has been pulled upon to cause the cylindrical wall 48 to expand and form the second flange 50 and the rod 38 is snapped off at the weak portion 44, thereafter there is no projection outwardly from the first flange 24. That is, the first flange 24 does not have any sharp parts extending therefrom. As is illustrated in FIG. 4, a cap 16 is used in this embodiment just as it is used in the embodiment of FIGS. 2 and 3.

OPERATION

The method of seating a sheet 12 of a relatively soft material such as insulation against a plate 10 of a relatively rigid material such as metal is as follows:

First, a plate 10 of the relatively rigid material is provided with a plurality of holes 30 therethrough. Second, there is inserted in said holes a plurality of linearly extending members 22 which fit snugly within the holes 30 and have a first flange 24 adjacent a first end 26 of the member 22 and extending outwardly from said first end 26 sufficiently to prevent passage of the member 22 through each of the holes, the first flange 24 fitting against a first side 28 of the plate 10. The members 22 each include a bore 32 extending longitudinally therein from the first end 26 thereof towards a second end 34 thereof. The bore 32 terminates at a chamber 36 of larger orthogonal dimension than the bore 32 and the chamber 36 terminates short of the second end 34 of the member 32. Each of the members 22 has a rod 38 fitting within and extending outwardly from the bore 32 and has at a first end 40 thereof a head 42 of larger orthogonal dimension than the bore 32. The head 42 fits within the chamber 36. The rod generally but not necessarily includes the weak portion 44 externally of the chamber 36, the weak portion 44 being easily breakable. Third, the flange 24 is held against a respective one side of the plate 10. Fourth, the head 42 is pulled against the shoulder 46 formed by the bore 32 adjacent the second end 34 of the members 22 via a generally longitudinal force exerted on the rod 38 to spread the member 22 against a respective other side of the plate 10 to form the second flange 50. Fifth, if the rod 38 includes a weak portion 44 it is broken at the weak portion forming a tapered end. Sixth, a sheet 12 of a relatively soft material is pushed over a plurality of studs 20 which pierce it, one stud 20 extending longitudinally from each of the members 22 generally away from the plate 10.

In the embodiments shown in FIGS. 2 and 3, when the rod 38 includes a weak portion 44, said weak portion is external of the bore 32 and the stud 20 extends longitudinally from the first side 28 of the plate 10 and comprise the broken-off rods. In the embodiment illustrated in FIG. 4 the stud 20 extends outwardly from the member 22 on the second side 52 of the plate 10 with said studs 20 extending from the second end 34 of the members 22. In this embodiment, the weak portion 44 of the rod 38 is within the bore 32 and breaks off therewithin. In all the embodiments, the method of the present invention may further include as an added step fitting the protective caps 16 over each of the projecting studs 20.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth and as fall within the scope of the invention and the limits of the appended claims.

What is claimed is:

1. In combination, a retainer holding a sheet of relatively soft material such as insulation against a plate of a relatively rigid material such as metal, comprising:
    a linearly extending member of a hard but deformable material having flange means extending outwardly adjacent a first end thereof bearing against a first side of said relatively rigid plate with the remainder of said member extending through a hole in said plate and a bore extending longitudinally in said member from said first end towards a second end thereof, said second end being upset to define an enlarged portion bearing against a second side of said relatively rigid plate, said bore terminating at a chamber of larger orthogonal dimension than said bore, said chamber terminating short of said second end of said member;
    a rod fitting within and extending outwardly from said bore and having at a first end thereof a head of larger orthogonal dimension than said bore, said head fitting within said chamber said rod initially having a weak portion positioned outside said bore with an extension of said rod being frangibly connected thereto by said weak portion, said extension being broken off after upset of said second end of said member;
    a stud extending at least about twice the thickness of said plate to project from said second side of said plate having a tapered end, said tapered end piercing said sheet of soft material which is pushed against it, said stud projecting longitudinally from said retainer after said rod
    means on said stud retaining said sheet of soft material thereon is broken at said weak portion thereof; and 2. A retainer as in claim 1, wherein said weak portion of said rod is within said bore and said stud is integral with said second end of said member and extends longitudinally therefrom and said tapered end of said stud is sharply pointed.

3. A retainer as in claim 2, wherein said retaining means comprises:
    a cap fitting over said tapered end of said projecting stud.

4. A method of seating a sheet of a relatively soft material such as insulation against a plate of a relatively rigid material such as metal, comprising:
    inserting in a plurality of holes passing through a plate of a relatively rigid material, a plurality of linearly extending members, said members fitting snugly within said holes and having first flange means adjacent a first end thereof extending outwardly therefrom sufficiently to prevent passage of said members through said holes and fitting against a first side of said plate, said members including a bore extending longitudinally therein from said first end towards a second end thereof, said bore terminating at a chamber of larger orthogonal dimension than said bore, said chamber terminating short of said second end of said member, each of said members having a rod fitting within and extending outwardly from said bore and having at a first end thereof a head of larger orthogonal dimension than said bore, said head fitting within said chamber;
    holding said first flange means against said first side of said plate;
    pulling said head against said bore adjacent said second end of each of said members via a generally longitudinal force exerted on said rods to spread said members into second flange means against a second side of said plate;

pushing a sheet of relatively soft material over a plurality of studs which pierce it, one stud projecting longitudinally from each of said members generally away from said plate; and attaching means to the free ends of said studs for retaining said sheet of releatively soft material thereon.

5. A method as in claim 4, wherein said rod includes a weak portion external of said chamber which is easily breakable and including as an added step prior to said pushing step:

breaking said rod at said weak portion.

6. A method as in claim 5, wherein said weak portion of said rod is external of said bore and said studs extend outwardly from said first side of said plate and comprise said broken-off rods.

7. A method as in claim 6, wherein said means attached to said studs comprises:

a protective holding cap over each of said projecting studs.

8. A method as in claim 5, wherein said studs extend from a second end of said members outwardly from said second side of said plate.

9. A method as in claim 8, wherein said weak portion of said rod is within said bore and breaks off therewithin.

10. A method as in claim 9, wherein said means attached to said studs comprises:

a protective holding cap over each of said projecting studs.

* * * * *

UNITED STATES PATENT OFFICE
CERTIFICATE OF CORRECTION

Patent No. 4,069,738  Dated January 24, 1978

Inventor(s) RANDALL D. McCLURE

It is certified that error appears in the above-identified patent and that said Letters Patent are hereby corrected as shown below:

Column 6, line 31, after "rod" insert --is broken at said weak portion thereof; and--

Column 6, line 33, after "thereon" delete "is broken at said weak portion thereof; and" and substitute therefor --.--.

*Signed and Sealed this*

*Eleventh* Day of *July 1978*

[SEAL]

Attest:

RUTH C. MASON
*Attesting Officer*

DONALD W. BANNER
*Commissioner of Patents and Trademarks*

Disclaimer 4,069,738.—*Randall D. McClure*, Decatur, Ill. INSULATION RETAINER AND ATTACHMENT METHOD THEREFOR. Patent dated Jan. 24, 1978. Disclaimer filed Mar. 7, 1980, by the assignee, *Caterpillar Tractor Co.*

Hereby enters this disclaimer to claims 1 through 10 of said patent.

[*Official Gazette, May 6, 1980.*]